United States Patent [19]

Dietz et al.

[11] 4,130,695
[45] Dec. 19, 1978

[54] LEAD-ACID STORAGE BATTERY AND ELECTRODE THEREFOR

[75] Inventors: Hermann Dietz, Gerlingen; Siegfried Ziegler, Hildesheim, both of Germany

[73] Assignee: Robert Bosch GmbH, Stuttgart, Germany

[21] Appl. No.: 853,431

[22] Filed: Nov. 21, 1977

[30] Foreign Application Priority Data

Dec. 23, 1976 [DE] Fed. Rep. of Germany ....... 2658493

[51] Int. Cl.$^2$ ..................... H01M 4/14; H01M 10/06
[52] U.S. Cl. ..................................... 429/215; 429/225
[58] Field of Search ............... 429/212, 217, 225, 226, 429/228, 209, 232, 204, 215

[56] References Cited

U.S. PATENT DOCUMENTS

| | | | |
|---|---|---|---|
| 2,130,104 | 9/1938 | Schaeffer et al. | 429/215 |
| 3,457,112 | 7/1969 | Reber | 429/225 X |
| 3,488,218 | 1/1970 | Metzler et al. | 429/215 X |
| 3,723,182 | 3/1973 | Venuto | 429/228 |
| 3,770,507 | 11/1973 | Weissman et al. | 429/217 X |

Primary Examiner—Anthony Skapars
Attorney, Agent, or Firm—Flynn & Frishauf

[57] ABSTRACT

Between 0.001 and 0.5% by weight of polytetrafluoroethylene powder is incorporated in the composite electrochemically active mass carried on the lead plates of a lead-acid storage battery. In the case of the positive electrodes, the result is to lengthen the service life in terms of cycles of charging and discharging. In the case of the negative electrodes, the effect is to raise the low-current yield and the low-temperature high-current yield. The density of the composite mass is reduced and its water-holding properties increased.

9 Claims, 1 Drawing Figure

U.S. Patent    Dec. 19, 1978    4,130,695
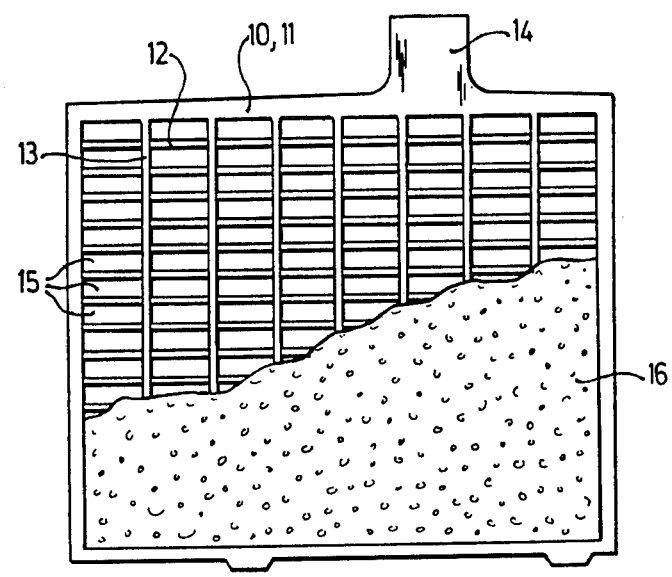

LEAD-ACID STORAGE BATTERY AND ELECTRODE THEREFOR

This invention relates to lead-acid storage batteries and the electrodes thereof, and particularly the constitution of the electrochemically active composite masses respectively provided on the positive and negative electrodes of the storage battery, these electrodes being most commonly in the form of battery plates suspended in an electrolyte provided in a casing, usually along with porous separators.

The electrodes or plates of a storage battery generally consist of a metal support, usually in the form of a lattice framework, perforated plate or the like, mainly of lead or a lead alloy, carrying as a coating of facing an electrochemically active composite mass containing the ingredients appropriate for the particular polarity of the electrode or plate, these ingredients being well known. The chemically active ingredients alone are insufficient for an electrode coating of adequate service life and various composite mixtures have been developed.

THE PRESENT INVENTION

It is an object of the present invention to improve the electrochemically active composite masses used on the metal frame cores or supports of lead-acid storage batteries, with a view to improving the performance of the battery and its service life.

Briefly, according to the invention there is incorporated in the electrochemically active composite mass on the electrodes of the battery a small amount of finely divided polytetrafluoroethylene powder (commonly known as PTFE powder), namely between 0.001 and 0.5% by weight, referred to the total weight of the composite mass provided for the particular electrode. Preferably, the PTFE powder content is between 0.01 and 0.05% by weight of the electrochemically active composite mass. The invention is applicable both to the negative and to the positive electrodes of a storage battery by providing the prescribed content of PTFE powder in the respective electrochemically active masses of the two kinds of electrodes. In the case of the positive electrodes the result is that the electrodes have an improved service life in a storage battery in terms of the number of cycles of charge and discharge which the storage battery undergoes, and in the case of the negative electrodes, the effect of the invention is that the electrodes and the battery have improved properties in terms of available low-current yield and cold-condition high-current yield. It appears to be a coincidence that the separate advantageous effects produced respectively in the negative electrodes and in the positive electrodes are found with substantially the same percentage of PTFE powder in the electrochemically active composite mass, referred in each case to the total weight of the composite mass for the particular kind of electrode.

Drawing, illustrating an example. The single FIGURE of the drawing represents a storage battery plate electrode with part of the electrochemically active coating removed to show the structure of the metal support.

A lead lattice framework 10, composed of a frame 11, cross rods 12 and longitudinal rods 13 and equipped with a connection lug 14, serves as the carrier for an electrochemically active mass 16 which fills the interstices 15 between the frame 11 and the lattice members 12 and 13, as well as coating the lattice framework as shown in the lower part of the figure. Both for the positive and negative battery plates, the electrochemically active mass 16 consists, as is well known, mainly of lead oxides and additives such as lignin and carbon, with water and sulfuric acid, applied in the form of a paste on the lattice of the carrier 10. According to the present invention this electrochemically active mass 16 contains finely divided PTFE powder not shown in the drawing because of the relatively small content thereof.

In the case of negative electrodes, PTFE powder is to be mixed into the electrochemically active mass according to the invention to the extent of 0.001 to 0.1% by weight, referring the weight to the total weight of the negative electrode electrochemically active mixture, the preferred percentage, however, lying between 0.01 and 0.05% by weight. As a result of such an addition of PTFE powder to the negative electrode electro-chemically active mass, an electrode composition of very low density is obtained, because, by virtue of the addition, the ability of the electrode composition to take up water is strongly increased. Whereas negative electrode compositions for lead-acid storage batteries having no PTFE powder content have been producible heretofore only down to densities of 4.2 g/ml, and that these densities tend to drop off material, yet, by the addition of PTFE powder a density of only 3.8 g/ml can be obtained. The available low-current capacity of the electrode can be raised by about 10% by the addition, for example, of 0.025 % by weight of PTFE powder to the electrochemically active mass of the negative electrode, and at the same time the cold-condition high-current yield can be raised by about 30%.

In the case of positive electrodes, the incorporation of PTFE powder, according to the invention, as an addition to the electrochemically active mass supported on the metal lattice carrier should again provide a content between 0.001 and 0.5% by weight of the finely divided PTFE powder, the percentage being referred to the aggregate weight of the electrochemically active positive electrode mass applied to the carrier framework or plate of the positive electrodes. The preferred addition percentage of PTFE powder again lies between 0.01 and 0.05% by weight.

As the result of addition of PTFE powder to the positive electrode chemically active mass, the service life of the electrode in a storage battery, in terms of the number of cycles of charging and discharging, is substantially raised. In the case of an addition of 0.05% by weight of PTFE powder to the positive electrode composite electrochemically active mass, for instance, there is produced an improvement of the service life in terms of cycles of charge and discharge of more than 40%.

When PTFE powder is incorporated in the electrochemically active battery plate masses of a storage battery in accordance with the present invention, the usual addition of synthetic resin fibers to the electrochemically active mass can be dispensed with. It follows from the facts stated above that lead-acid storage batteries of known construction can advantageously contain either negative electrodes according to the invention or positive electrodes according to the invention, but it is however of the greatest advantage if both positive and negative electrodes according to the invention are utilized in a storage battery.

Although the invention has been described specifically in connection with a plate-type electrode, the invention is not limited thereto and addition of PTFE powder in accordance with the invention to other types of lead-acid storage batteries, as for example batteries in form of small tubes, is also advantageous.

As examples of typical battery electrodes produced in accordance with the present invention, there are given below illustrations of the preparation of an electrochemically active mass for a negative plate electrode and an example of an electrochemically active mass for a positive plate electrode.

TABLE I.

| Negative Electrode | |
|---|---|
| Constituents | Percent by Weight |
| Carbon Black | 0.1 |
| Barium Sulphate | 0.4 |
| Colophony | 0.025 |
| Lignin | 0.6 |
| PTFE powder | 0.025 |
| Polypropylene Fibers (required in special cases only) | 0.1 |
| Lead Oxide | balance |

The dry ingredients are mixed in a edge runner. The liquids are then added to form a paste.

This negative paste is applied to fill the lattice spaces of the framework and to coat the framework that the total thickness between opposite surfaces of the paste mass is 1.4 mm.

TABLE II.

| Positive Electrode | |
|---|---|
| Constituents | Percent by Weight |
| Red Lead | 1 % |
| Zinc Oxide | 0.5 % |
| PTFE Powder | 0.05 % |
| Polyropylene Fibers (required in special cases only) | 0.1 % |
| Lead Oxide | balance |

The mixture is prepared and applied by the same method described for the case of the negative electrode. this positive paste is applied to fill the lattice spaces of the framework and to coat the framework that the total thickness between opposite surfaces of the paste mass is 1.5 mm.

For both electrodes the metal framework is of lead containing 3.75% antimony and 0.2% arsenic.

We claim:

1. An electrode for a lead-acid storage battery comprising a metal support consisting at least partly of lead and an electrochemically active composite mass (16) supported thereon, said composite mass containing between 0.001 and 0.1% by weight of finely divided polytetrafluoroethylene powder, said percentage being referred to the total weight of said composite mass.

2. An electrode as defined in claim 1, in the form of a plate electrode in which said metal support is a metal lattice framework and in which said composite electrochemically active mass contains between 0.01 and 0.05% by weight of finely divided polytetrafluoroethylene, said percentage being referred to the weight of said composite mass.

3. An electrode as defined in claim 2, which is constituted as a negative electrode and in which the electrochemically active composite mass is of a composition and electrochemical activity suitable for a negative electrode, whereby the presence of said percentage of finely divided polytetrafluoroethylene powder improves the low-current and cold-condition high-current yields.

4. An electrode as defined in claim 2, in which the electrode is constituted as a positive electrode and said composite mass is of a composition suitable for a positive electrode, whereby the presence of said percentage of finely divided polytetrafluoroethylene powder improves the service life of the electrode in a battery in terms of number of cylces of charging and discharging of the battery.

5. A lead-acid storage battery in which at least each of the electrodes of one polarity is constituted of a metal support consisting at least partly of lead and an electrochemically active composite mass (16) supported thereon, said composite mass containing between 0.001 and 0.1% by weight of finely divided polytetrafluoroethylene powder, said percentage being referred to the total weight of said composite mass.

6. A storage battery as defined in claim 5, in which the content of said composite mass on said electrodes which contains polytetrafluoroethylene powder is between 0.01 and 0.05% by weight, referred to the total weight of said composite mass.

7. A storage battery as defined in claim 6, in which the electrodes having a composite electrochemically active mass containing polytetrafluoroethylene powder as aforesaid are the negative electrodes of the battery.

8. A storage battery as defined in claim 6, in which the electrodes having a composite electrochemically active mass containing polytetrafluoroethylene powder as aforesaid are the positive electrodes of the battery.

9. A storage battery as defined in claim 6, in which all of the plates of said battery comprise a metal support consisting at least partly of lead and an electrochemically active composite mass supported thereon, said composite means containing between 0.01 and 0.05% by weight of finely divided polytetrafluoroethylene powder, said percentage being referred to the total weight of said composite mass on the particular electrode.

* * * * *